United States Patent
Green et al.

(10) Patent No.: US 11,358,326 B2
(45) Date of Patent: Jun. 14, 2022

(54) HOTEND FOR ADDITIVE MANUFACTURING WITH AN ACTUATED ROD IN A HEATED CHAMBER

(71) Applicant: Board of Regents, The University of Texas System, Austin, TX (US)

(72) Inventors: Joshua T. Green, El Paso, TX (US); Roger V. Gonzalez, El Paso, TX (US)

(73) Assignee: Board of Regents, The University of Texas System, Austin, TX (US)

(*) Notice: Subject to any disclaimer, the term of this patent is extended or adjusted under 35 U.S.C. 154(b) by 412 days.

(21) Appl. No.: 16/421,273

(22) Filed: May 23, 2019

(65) Prior Publication Data
US 2019/0358893 A1 Nov. 28, 2019

Related U.S. Application Data

(60) Provisional application No. 62/675,563, filed on May 23, 2018.

(51) Int. Cl.

| | | |
|---|---|---|
| *B29C 64/118* | (2017.01) | |
| *B29C 64/209* | (2017.01) | |
| *B29C 48/793* | (2019.01) | |
| *B29B 7/74* | (2006.01) | |
| *B29C 65/00* | (2006.01) | |
| *B33Y 10/00* | (2015.01) | |
| *B33Y 80/00* | (2015.01) | |
| *F26B 15/14* | (2006.01) | |

(52) U.S. Cl.
CPC .......... *B29C 64/118* (2017.08); *B29B 7/7471* (2013.01); *B29C 48/793* (2019.02); *B29C 66/934* (2013.01); *B33Y 10/00* (2014.12); *B33Y 80/00* (2014.12); *F26B 15/14* (2013.01)

(58) Field of Classification Search
CPC ... B29C 64/118; B29C 64/209; B29C 48/793; B29C 66/934; B29B 7/7471; B33Y 10/00; B33Y 80/00; B33Y 30/00; F26B 15/14
See application file for complete search history.

(56) References Cited

U.S. PATENT DOCUMENTS 5,752,370 A * 5/1998 Linkiewicz ............. B29C 65/18
53/374.6
2016/0332382 A1 11/2016 Coward et al.

FOREIGN PATENT DOCUMENTS

| KR | 20160080894 A | | 7/2016 | |
|---|---|---|---|---|
| KR | 20180053153 A | * | 5/2018 | |
| KR | 20180053153 A | | 5/2018 | |
| WO | 2018038326 A1 | | 3/2018 | |
| WO | WO-2018038326 A1 | * | 3/2018 | ............. B29C 67/00 |

OTHER PUBLICATIONS

Patent Cooperation Treaty, International Search Report and Written Opinion, dated Sep. 18, 2019, regarding Application No. PCT/US2019/033856, 12 pages.

* cited by examiner

*Primary Examiner* — Alexander M Weddle
(74) *Attorney, Agent, or Firm* — Yee & Associates, P.C.

(57) ABSTRACT

A hotend assembly for an additive manufacturing device. The hotend assembly comprises a heated chamber, a number of inlets configured to feed filament into the heated chamber, and an exit orifice from the heated chamber. An actuated rod extends into the heated chamber and is rotated by a motor, wherein the actuated rod is configured to impart mechanical energy to the filament inside the heated chamber prior to extrusion through the exit orifice.

20 Claims, 10 Drawing Sheets

HOTEND FOR ADDITIVE MANUFACTURING WITH AN ACTUATED ROD IN A HEATED CHAMBER

CROSS-REFERENCE TO RELATED PROVISIONAL APPLICATION

This application claims the benefit of U.S. Provisional Patent Application Ser. No. 62/675,563, filed May 23, 2018, and entitled "Hotend for Additive Manufacturing with an Actuated Element in a Heated Chamber."

BACKGROUND INFORMATION

1. Field

The present disclosure relates to three-dimensional printing and in particular to methods and devices for improving fused filament fabrication.

2. Background

The development and application of additive manufacturing (AM) has advanced many industries. Of the many AM technologies, fused filament fabrication (FFF) has been at the forefront of these advancements. Among FFF's advantages is the ability to incorporate functionalized filaments composed of material blends and/or composites that enable production of parts with a wide range of material properties. However, current FFF technologies do not offer the function of actively mixing these filaments during the printing process.

A major limitation preventing further expansion and application of FFF is its comparatively slow print speed. This characteristic of performance can be inhibited by multiple design features of an AM printer, of which, the filament driving mechanism may be the most common limiting factor.

SUMMARY

An illustrative embodiment provides a hotend assembly for an additive manufacturing device. The hotend assembly comprises a heated chamber, a number of inlets configured to feed filament into the heated chamber, and an exit orifice from the heated chamber. The hotend also comprises an actuated rod extending into the heated chamber, wherein the actuated rod is configured to impart mechanical energy to the filament inside the heated chamber prior to extrusion through the exit orifice Another illustrative embodiment provides a hotend assembly for an additive manufacturing device. The hotend assembly comprises a heated chamber. A number of inlets are configured to feed filament into the heated chamber, wherein the inlets are inserted into the heated chamber within a common plane around the heated chamber with approximately 120 degrees of separation between each inlet. An actuated rod extends into the heated chamber, wherein the actuated rod is configured to impart mechanical energy to filaments inside the heated chamber prior to extrusion through an exit orifice from the heated chamber. A motor is configured to rotate the actuated rod, and a flexible coupling couples the actuated rod to the motor, wherein the exit orifice, the actuated rod, the motor, and the flexible coupling are axially aligned.

Another illustrative embodiment provides a method of additive manufacturing. The method comprises feeding filament into a heated chamber of a hotend through a number filament inlets, wherein the hotend is mounted to an additive manufacturing device. As the filament is heated by the heated chamber an actuated rod is rotated within the heated chamber to impart mechanical energy to the filament. The filament is then extruded through an exit orifice of the hotend.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more considerations. For example, the illustrative embodiments recognize and take into account that current fused filament fabrication (FFF) systems do not offer the function of actively mixing filaments during the printing process. Without this function, FFF is limited to production of parts with discontinuous material interfaces, constrained distribution and dispersion of material components, and restricted local variation of composition. Adding this function would expand FFF capabilities to enable the production of complex structures including functionally graded materials.

Illustrative embodiments also recognize and take into account that FFF systems currently have a comparatively slow print speed. This limitation is particularly evident during the use of flexible filaments which can buckle and expand as they are axially compressed. This effect can be minimized by imparting some of the required mechanical energy to the filament after it has entered the hotend rather than rely on the filament drive system to provide the entirety of the mechanical energy needed for extrusion.

Thus, the illustrative embodiments provide an apparatus and method for improving fused filament fabrication. For example, the illustrative embodiments recognize and take into account that an interaction between an actuated rod and filament can result in an improved dispersion and distribution of materials contained in the filaments. Furthermore, the illustrative embodiments recognize and take into account that the interaction between the actuated rod and filament can result in an improved feed rate which in turn improves the printing rate.

The apparatus comprises an actuated rod powered by a motor where, dependent on the geometry of the actuated rod, materials contained in the filament have an improved dispersion and distribution and the feed rate of the filament is increased.

Certain terms are used throughout the following description and claims to refer to particular device components and configurations. As one skilled in the art will appreciate, the same component may be referred to by different names. This document does not intend to distinguish between components that differ in name but not function.

Figure 1:
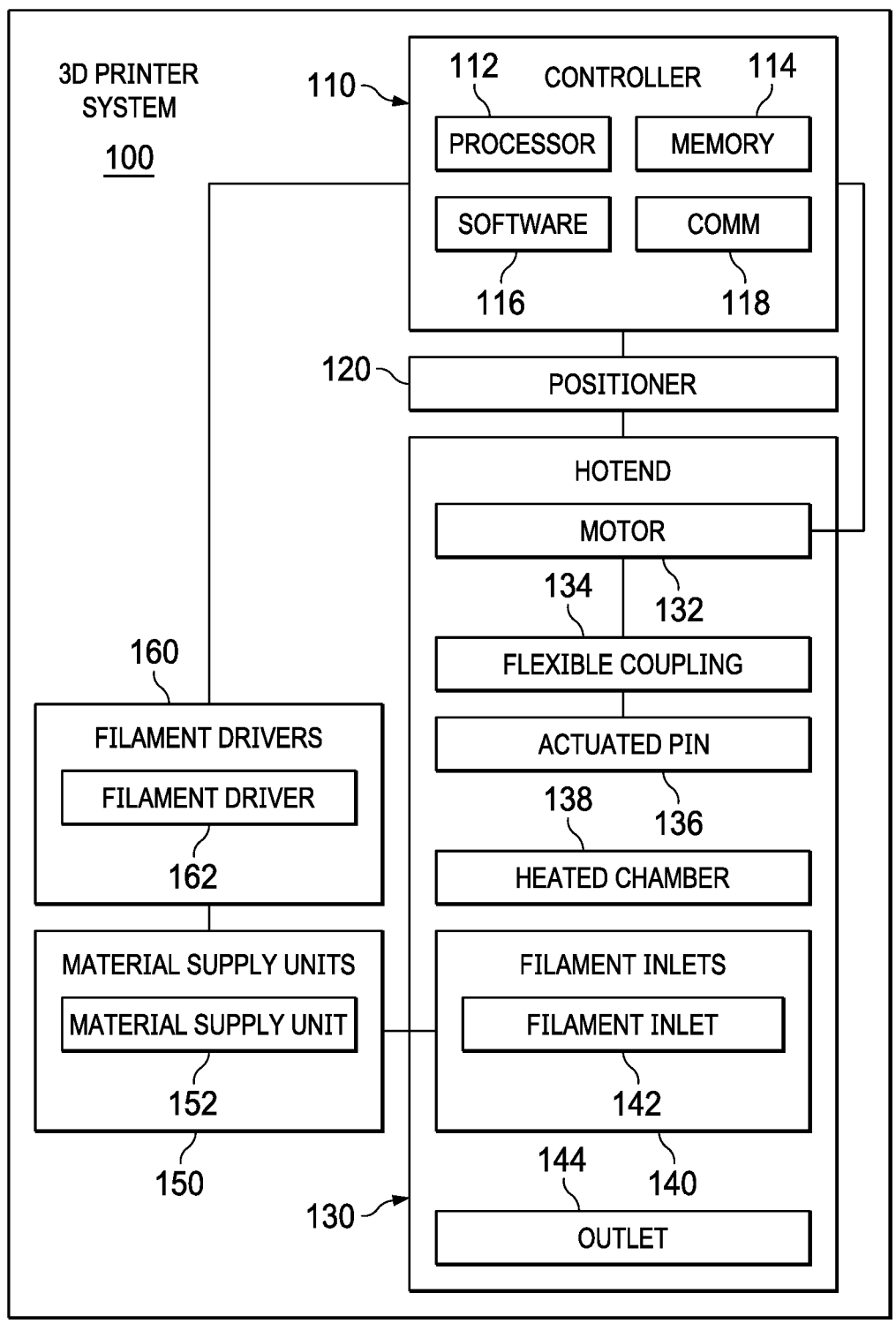
FIG. 1 depicts a block diagram of a 3D printer system in accordance with an illustrative embodiment.

With reference now to the figures and, in particular, with reference to FIG. 1, a block diagram of a 3D printer system 100 is depicted in accordance with an illustrative embodiment. 3D printer system 100 comprises a controller 110, material supply units 150, and a hotend 130.

Controller 110, which might prepare the digital data that characterizes a 3-D object for printing, and control the operation of the printing apparatus, can include, for example, a processor 112, a memory unit 114, software code 116, and a communications unit 118. Other configurations may be used for a controller or control unit. Controller 110 might be located inside 3D printing system 100 or outside of printing system 100 and communicate with the printing system over a wire and/or using wireless communications. Control functionality might be spread across units, and not all control functionality may be within system 100. For example, a separate unit, such as a personal computer or workstation, or a processing unit within a supply source such as a cartridge may provide some control or data storage capability.

Communications unit 118 enables transfer of data and instructions between controller 110 and hotend 130, between controller 110 and material supply units 150, between controller 110 and positioner 120, between controller 110 and motor 132, and/or between controller 110 and other system elements. Controller 110 can be suitably coupled and/or connected to various components of 3D printing system 100.

Controller 110 might utilize Computer Object Data (COD) representing an object or a model, for example, CAD data in STL format. Other data types or formats can be used. Controller 110 converts such data to instructions for the various units within 3D printer system 100 to print a 3D object. Controller 110 may be located inside the printing apparatus or outside of the printing apparatus and communicate with the printing apparatus through wired or wireless communication. In an embodiment, controller 110 includes a CAD system or other suitable design system.

In some embodiments, a printing file or other collection of print data can be prepared and/or provided and/or programmed, for example, by a computing platform connected to 3D printer system 100. The printing file can be used to determine the order and configuration of deposition of building material via movement and activation of hotend 130.

Positioner 120, or other suitable movement device, controls the movement and position of hotend 130 during extrusion of material during 3D printing.

Controller 110 can be implemented using any suitable combination of hardware and/or software. In some embodiments, controller 110 includes a processor 112, a memory 114, and software or operating instructions 116. Processor 112 can comprise conventional devices, such as a Central Processing Unit (CPU), a microprocessor, a "computer on a chip", a micro controller, etc. Memory 114 can comprise conventional devices such as Random Access Memory (RAM), Read-Only Memory (ROM), or other storage devices, and may include mass storage, such as a CD-ROM or a hard disk.

Material supply units 150 supply building materials to hotend 130. Building materials can include any suitable kind of object building material, such as, for example, photopolymers, wax, powders, plastics, metals, and may include modeling material, support material and/or release material, or any alternative material types or combinations of material types. In some embodiments, the building materials used for construction of the 3D object are in a liquid form. In an exemplary embodiment, the modeling and/or support materials used are photopolymers that may contain material curable by electro-magnetic radiation and/or electron beams etc. The materials may come in different forms, textures, colors, etc. Other suitable materials or combinations of materials may be used.

During FFF, each material supply unit 152 in material supply units 150 supplies a separate material to a correspond filament inlet 142 among filament inlets 140 in hotend 130. Filament driver 162 control the flow of material from the material supply units 150 to the inlets 140, with a separate driver 162 for each supply unit 152. In an embodiment, at least one of the materials supplied by material supply units 150 to the filament inlets 140 is heterogeneous to materials supplied by the other material supply units.

The building material from the filament inlets enters a heated chamber 138 in hotend 130, where they are blended together and extruded through outlet 144 with the assistance of an actuated rod 136 extending into the center of the heated chamber 138. The actuated rod 136 is controlled by motor 132, which is coupled to rod via a flexible coupling 134.

Figure 2:
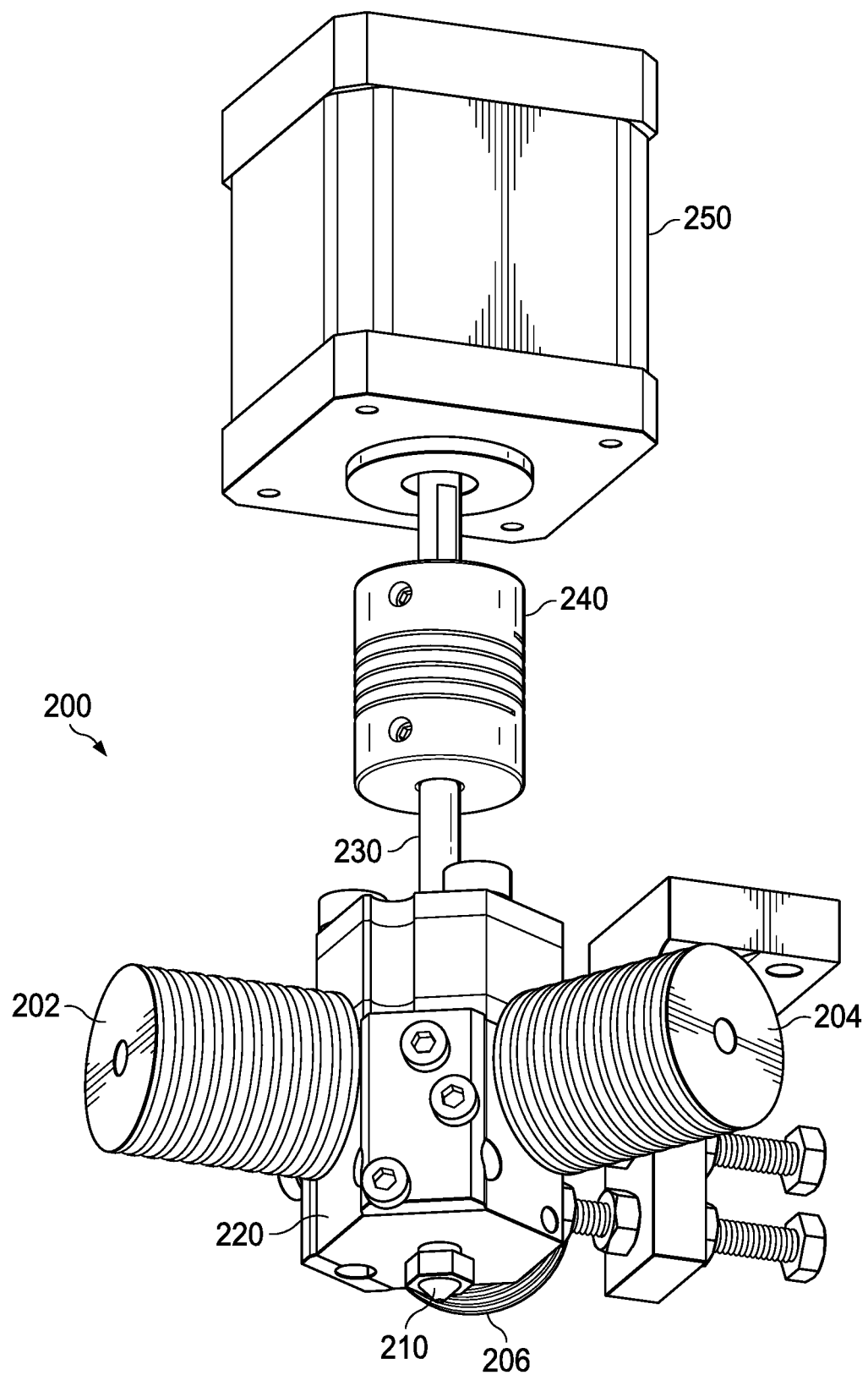
FIG. 2 is an oblique view of a hotend for a 3D printing system in accordance with an illustrative embodiment.

FIG. 2 is an oblique view of a hotend for a 3D printing system in accordance with an illustrative embodiment. Hotend 200 is an example implementation of hotend 130 in FIG. 1. In the example shown in FIG. 2, hotend 200 includes three filament inlets 202, 204, and 206, that feed into a heated chamber 220. In other embodiments, the number of filament inlets can be more or fewer than three.

Hotend 200 is mounted on an additive manufacturing (AM) printer and imparts mechanical energy to materials introduced as filament through inlets 202, 204, 206. Specifically, the mechanical energy is imparted by the rotation of actuated rod 230, which is in contact with heated or melted filament prior to extrusion.

The actuated rod 230 is driven by a motor 250. A flexible coupling 240 couples the actuated rod 230 and the motor 250. In alternate embodiment, flexible coupling 240 can be replaced by gears integrated into the drive mechanism. Actuated rod 230 can be selected from at least one of a blending actuated rod 230a or a speed actuated rod 230b, shown more clearly in FIG. 6. As explained in more detail below, blending actuated rod 230a is configured for uniform blending while speed actuated rod 230b is configured to increase a feed rate and print speed of the hotend 200.

Filament is fed into the heated chamber 220 through each of the filament inlets 202, 204, and 206. While in the heated chamber 220, the filament interacts with the actuated rod 230 while simultaneously being heated by the heated chamber 220 to a specified temperature. After the filament is heated to the specified temperature it is extruded through an exit orifice 210 of the hotend 200.

Figure 3:
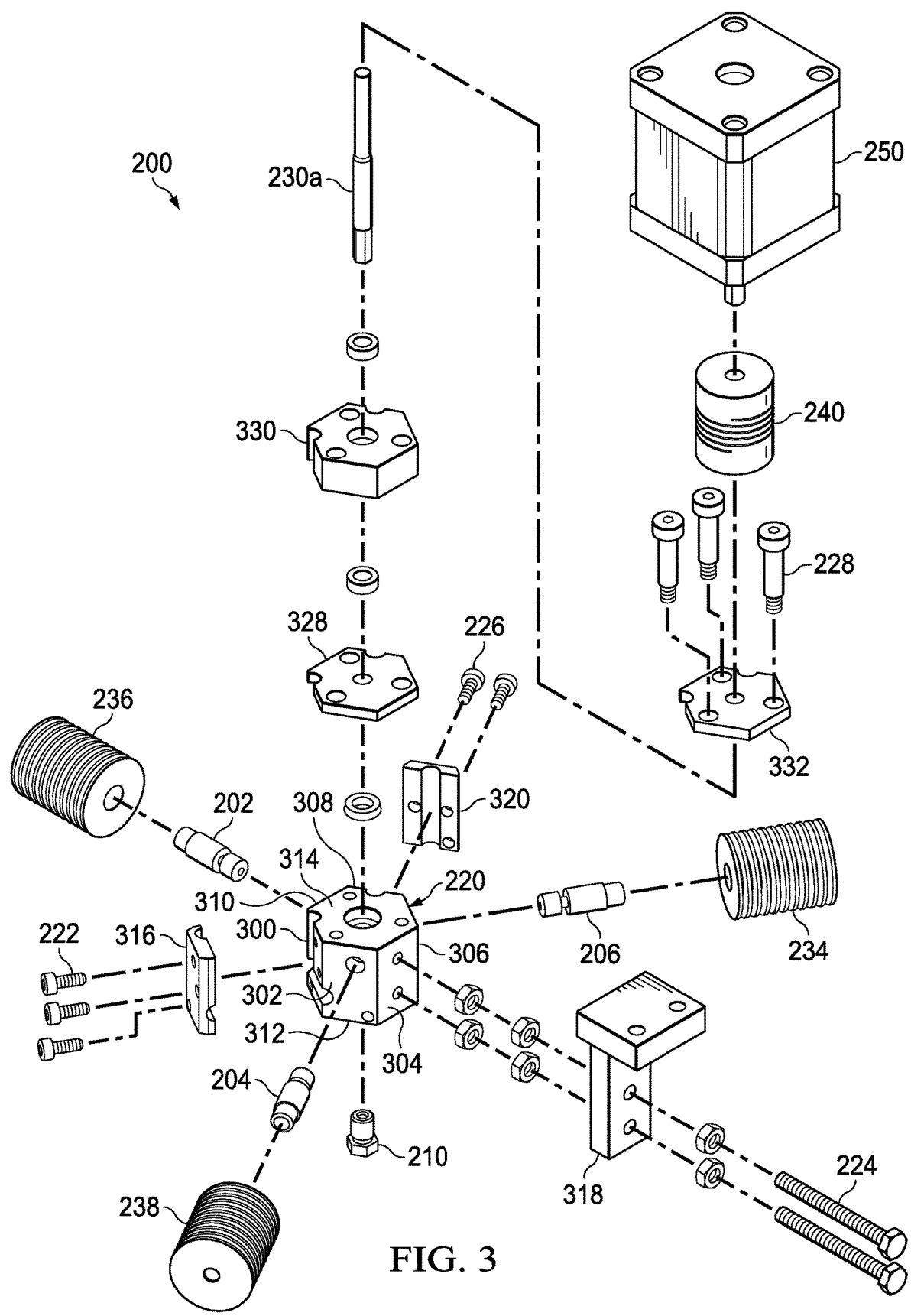
FIG. 3 depicts an exploded view of the hotend in accordance with an illustrative embodiment.
Figure 4A:
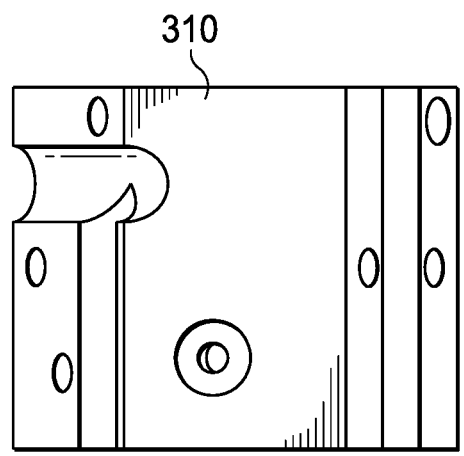
FIGS. 4A-4G illustrate a set of projected views of the heated chamber in accordance with an illustrative embodiment.
Figure 4B:
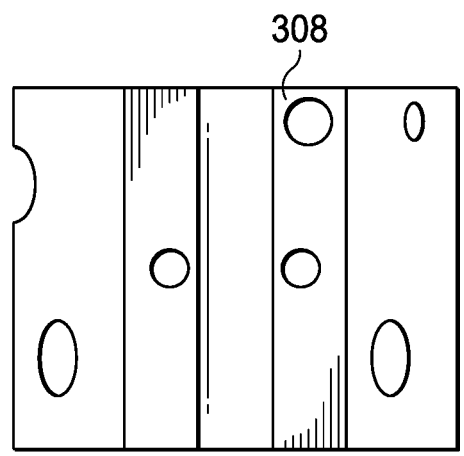
Figure 4C:
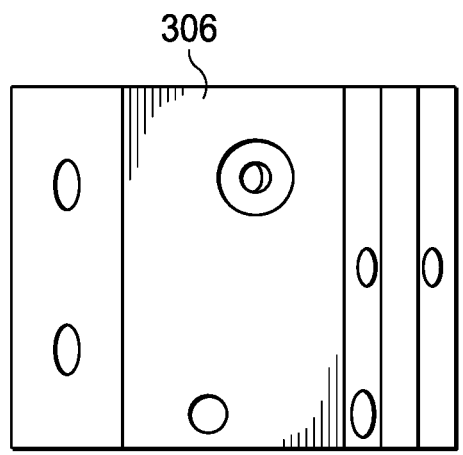
Figure 4D:
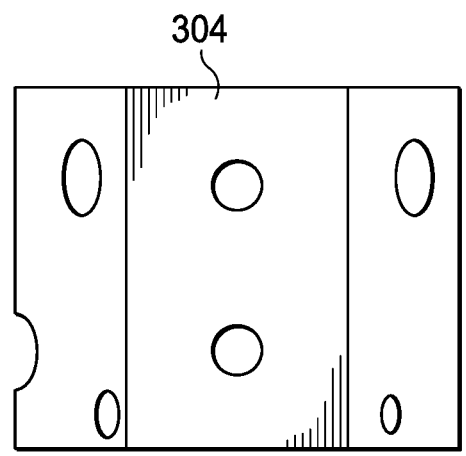
Figure 4E:
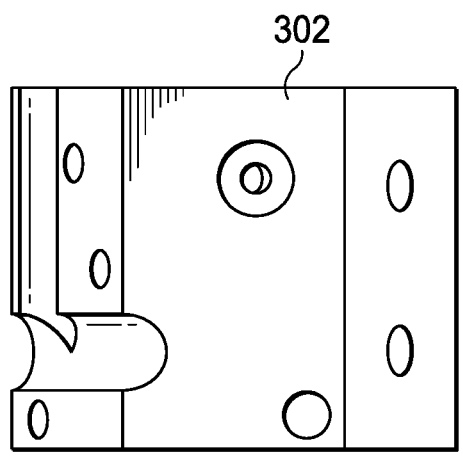
Figure 4F:
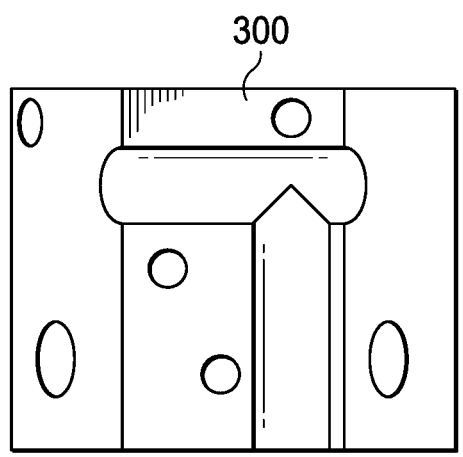
Figure 4G:
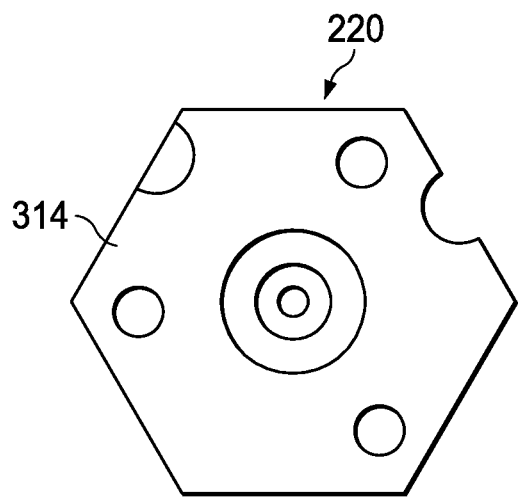

FIG. 3 depicts an exploded view of hotend 200 in accordance with an illustrative embodiment. In this illustrative embodiment, heated chamber 120 has eight separate sides 300, 302, 304, 306, 308, 310, 312, and 314.

FIG. 3 shows a first side plate 316, a second side plate 318, and a side third plate 320. The first side plate 316 is coupled to side 300 of the heated chamber 220 by a first set of screws 222. The second side plate 318 is coupled to side 304 of the heated chamber 220 using a second set of screws 224. The third side plate 320 is coupled to side 308 of the heated chamber 220 using a third set of screws 226.

Exit orifice 210 is threaded to bottom side 312 of heated chamber 220. A first upper plate 328 is coupled to top side 314 of the heated chamber 220. A bearing housing 330 is sandwiched between first upper plate 328 and a second upper plate 332. The upper plates 328, 332 and bearing housing 330 are coupled together using a fourth set of screws 228.

Hotend 200 further includes a first heat sink 234, a second heat sink 236, and a third heat sink 238. Each heat sink covers a respective filament inlet 202, 204, 206 once the filament inlet has been inserted within the heated chamber 220.

Filament inlet 202 and first heat sink 234 are coupled to side 310 of heated chamber 220. Filament inlet 204 and second heat sink 236 are coupled to side 202 of heated chamber 220. And filament inlet 206 and third heat sink 238 are coupled to side 306 of heated chamber 220.

Filament inlets 202, 204, 206 are inserted into the heated chamber 220 within a substantially common plane, with approximately 120 degrees of separation between each filament inlet within the common plane.

The exploded view of hotend 200 shown in FIG. 3 illustrates the axial relationship between the exit orifice 210 and the actuated rod 230. In this illustrative example, the actuated rod 230 is the blended actuated rod 230a. However, the actuated rod 230, can also be the speed actuated rod 230b.

The exploded view in FIG. 3 also clearly illustrates the axial alignment of the exit orifice 210, the actuated rod 230, the flexible coupling 240 and the motor 250. The flexible coupling 240 couples the actuated rod 230 to the motor 250, which rotates the actuated rod 230 in either a clockwise or counter-clockwise direction.

FIGS. 4A-4G illustrates a set of projected views of the heated chamber in accordance with an illustrative embodiment. an exploded view of heated chamber 120 is shown. FIG. 4A-4G illustrate planar views of sides 310, 308, 306, 304, 302, 300, and 314, respectively, of heated chamber 220 in greater detail.

Sides 300, 302, 304, 306, 308, and 310 make up six respective sides of the heated chamber 220. However, in alternative embodiments, heated chamber 220 can comprise more or fewer number of sides, including, but not limited to, three sides, four sides, five sides or any other suitable number of sides. In addition, the heated chamber can assume other shapes. For example, the heated chamber can be round without flat sides.

Figure 5A:
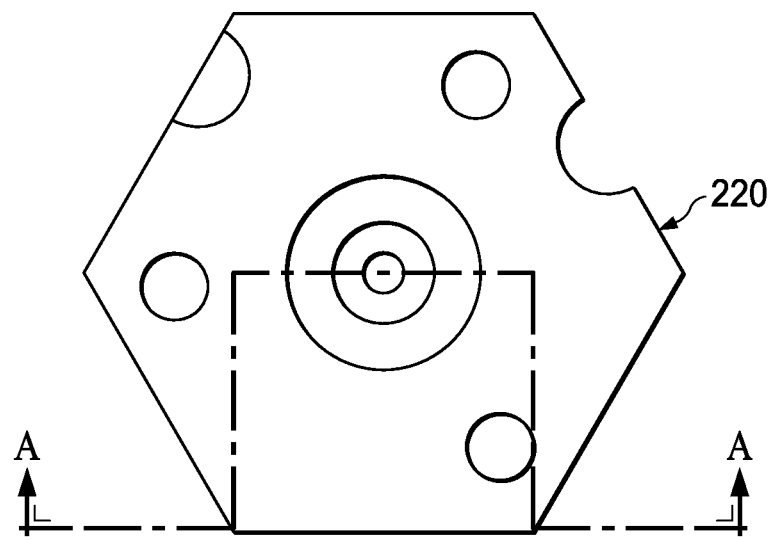
FIGS. 5A-5B depict top and sectional views of the heated chamber in accordance with an illustrative embodiment.
Figure 5B:
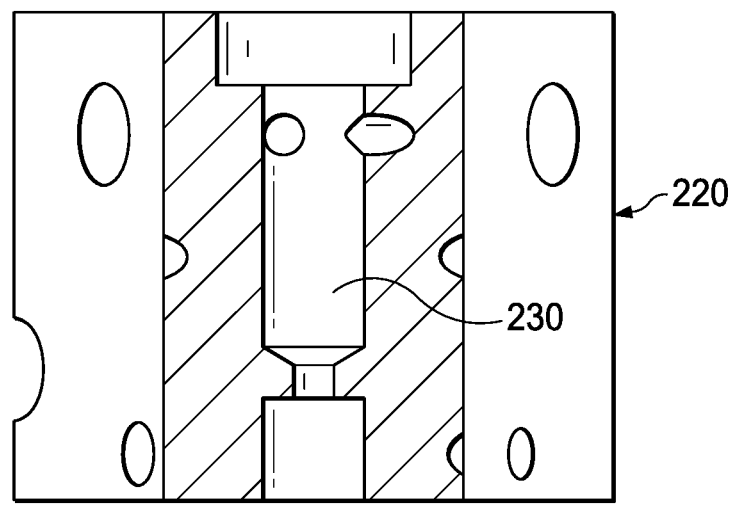

FIGS. 5A and 5B depict top and sectional views of the heated chamber in accordance with an illustrative embodiment. A top view of the heated chamber 220 in FIG. 5A is shown above a cross-sectional view of the heated chamber 220 in FIG. 5B along line a-a. The cross-sectional view illustrates the manner in which the actuated rod 230 extends into the heated chamber 220.

Figure 6:
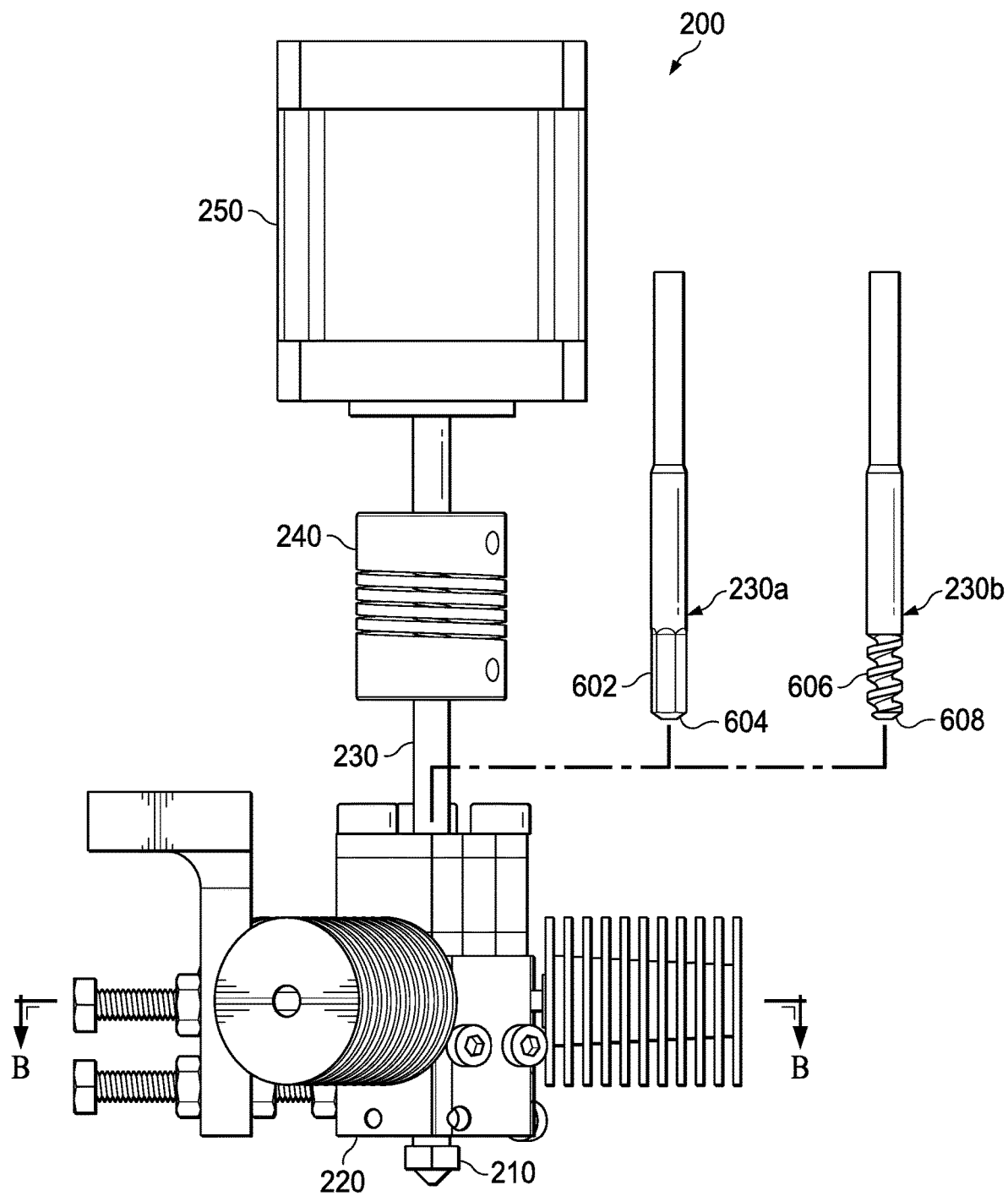
FIG. 6 illustrates a side plan view of a hotend assembly in accordance with an illustrative embodiment.

FIG. 6 illustrates a side plan view of hotend assembly 200 in accordance with an illustrative embodiment. FIG. 6 shows the alternate version of actuated rod 230.

Figure 7A:
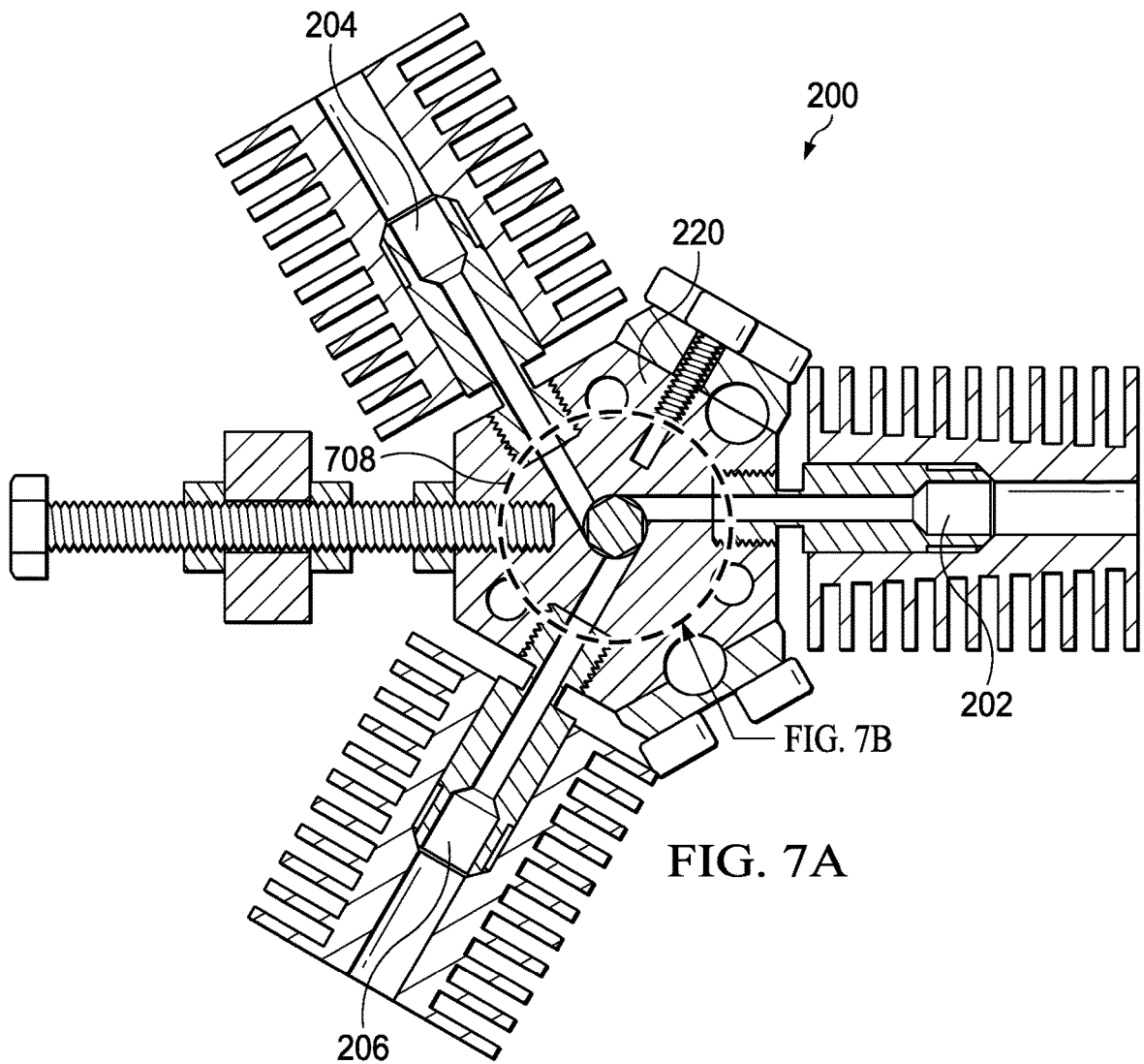
FIGS. 7A-7B depict a top sectional view of the hotend with the blending actuated rod in accordance with an illustrative embodiment.
Figure 7B:
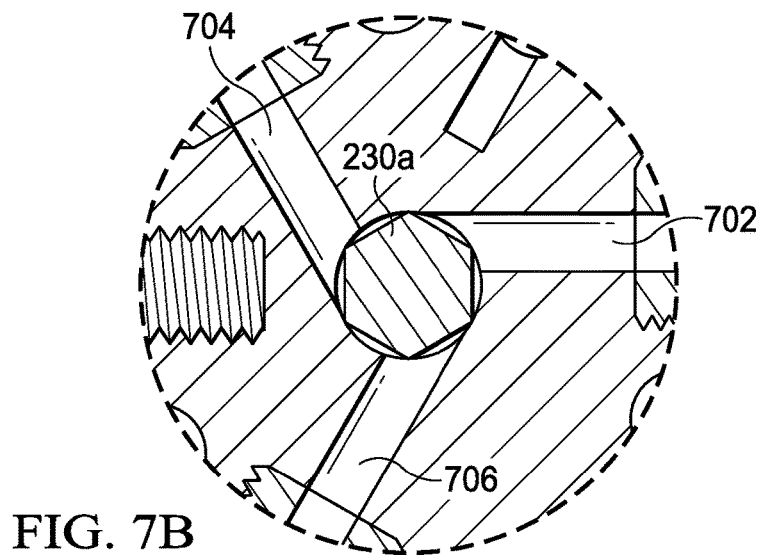

Blending actuated rod 230a is configured to uniformly blend material filaments entering the heated chamber 220 through the respective inlets (see FIGS. 7A-7B). The blending actuated rod 230a improves dispersion and distribution of materials contained in the filaments which are fed into the heated chamber 220. The control of composition and uniformity provided by the blending actuated rod 230a can be used by the host printer (e.g., 3D printer 100) and associated controller (e.g., controller 110) to provide local composition control.

Blending actuated rod 230a can be used to minimize discontinuous material interfaces and fabricate complex structures including functionally graded materials. In an embodiment, the blending actuated rod 230a comprises a hexagonal shape with six flat faces 602 at a first end 604. However, in other embodiments, first end 604 can comprise any number of flat faces 602, including, but not limited to, two, three, four, and five flat faces.

FIG. 6 also depicts the speed actuated rod 230b. Speed actuated rod 230b imparts mechanical energy for an increased feed rate of filament through the hotend 200 in support of increased print speeds (see FIGS. 8A-8B).

In an embodiment, the speed actuated rod 230b comprises a first end 608 that takes the shape of helix 606. However, in other embodiments, the first end 608 of the speed actuated rod 230b can take any suitable three-dimensional shape such as, but not limited to, a cube, a sphere, or a rectangular prism.

FIGS. 7A-7B depict a top sectional view of the hotend with the blending actuated rod in accordance with an illustrative embodiment. FIGS. 7A-7B are a section view along line b-b in FIG. 6 providing details of the hotend 200 configured for uniform blending including the heated chamber 220, filament inlets 202, 204, 206, and blending actuated rod 230a.

As discussed above, the use of blending actuated rod 230a is used to improve dispersion and distribution of the materials contained in the filaments that are fed into the heated chamber 220.

FIGS. 7A-7B further illustrate a first channel 702, a second channel 704, and a third channel 706. Filament travels from the inlets 202, 204, 206 and through the channels 702, 704, 706 into the heated chamber 220. Arrow 708 illustrates the directions in which the blending actuated rod 230a can rotate to blend the filament, clockwise or counter-clockwise.

Figure 8A:
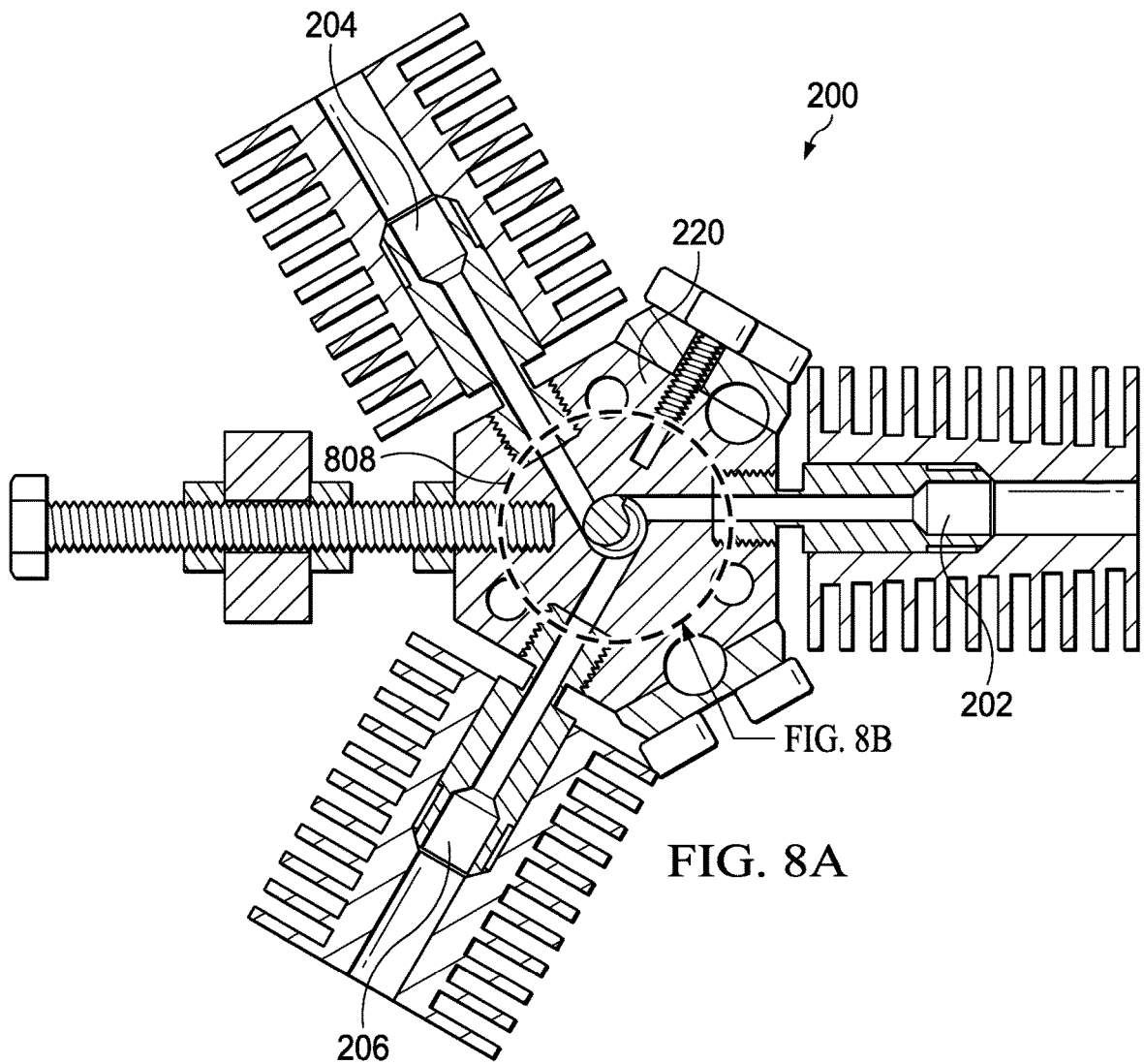
FIGS. 8A-8B depict a top sectional view of the hotend with the speed actuated rod in accordance with an illustrative embodiment.
Figure 8B:
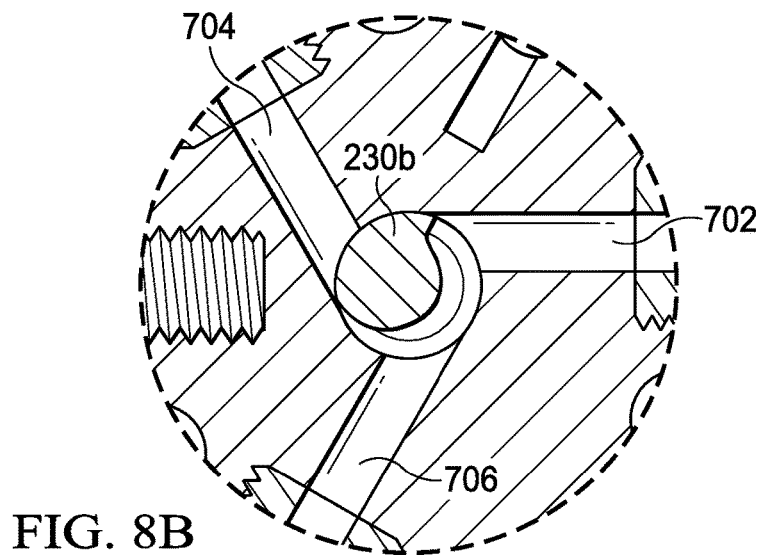

FIGS. 8A-8B depict a top sectional view of the hotend with the speed actuated rod in accordance with an illustrative embodiment. FIGS. 8A-8B are a section view along line b-b in FIG. 6 providing details of the hotend 200 configured for uniform blending including the heated chamber 220, filament inlets 202, 204, 206, and speed actuated rod 230b.

In FIGS. 8A-8B, the speed actuated rod 230b has screw-like features (shown more clearly in FIG. 6) to convert rotational energy into axial flow through the heated chamber and increase flow rate through the exit orifice 210. The actuated rod 230b is configured to assist in control of axial flow through the heated chamber 220. Control of axial flow through the heated chamber 220 comprises an increased flow rate through the exit orifice 210 (see FIGS. 2 and 6). Control, including rapid changes in flow rate, can be obtained by coordinating rotation of the actuated rod 230b with the filament drivers 162.

Arrow 808 illustrates the directions in which the speed actuated rod 230b can rotate. Like the blending rod 230a, the speed actuated rod 230b can rotate in either a clockwise direction or counter-clockwise direction.

It should be noted that the blending rod 230a and speed rod 230b are simple configurations of the rod. The actuated rod can assume other configurations that may in fact incorporate both flat surfaces and helical shapes in a single rod. In an embodiment, two actuated rods can be employed in a twin-screw configuration.

Figure 9:
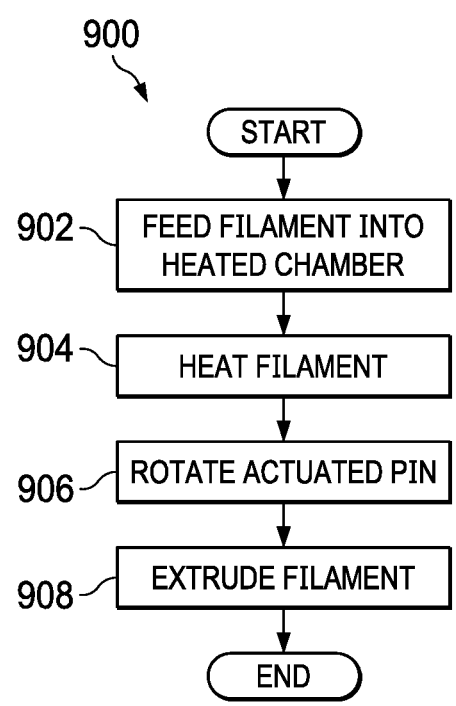
FIG. 9 is a flowchart illustrating the processing of filament in the hotend in accordance with illustrative embodiments.

FIG. 9 is a flowchart illustrating the processing of filament in the hotend 200 in accordance with illustrative embodiments. Process 900 begins by feeding filament into the heated chamber through a number of filament inlets (step 902). After being fed into the heated chamber, the heated chamber heats the filament to an appropriate temperature (step 904). While the filament is being heated, the motor rotates the actuated rod within the heated chamber to impart mechanical energy to the filament (step 906). Process 900 concludes by extruding the filament through an exit orifice 210 of the hotend (step 908).

The flowchart and block diagram in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The term "couple" or "couples" is intended to mean either an indirect or direct connection. Thus, if a first device couples to a second device, that connection can be through a direct connection, or through an indirect connection via other devices and connections.

As used herein, the phrase "a number" means one or more. The phrase "at least one of", when used with a list of items, means different combinations of one or more of the listed items may be used, and only one of each item in the list may be needed. As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the invention.

What is claimed is:

1. A hotend assembly for an additive manufacturing device, the hotend assembly comprising:
    a heated chamber;
    a number of inlets configured to feed a filament into the heated chamber;
    an exit orifice from a first end of the heated chamber;
    a bearing housing attached at a second end of the heated chamber opposite the first end; and
    an actuated rod extending from the bearing housing into the heated chamber, wherein the filament enters the heated chamber tangentially to the actuated rod, and wherein the actuated rod imparts mechanical energy to the filament inside the heated chamber prior to extrusion through the exit orifice.

2. The hotend assembly according to claim 1, wherein the actuated rod is capable of distributing and disbursing constituents of the filament within the heated chamber.

3. The hotend assembly according to claim 2, wherein the actuated rod blends two or more filaments uniformly.

4. The hotend assembly according to claim 1, further comprising a number of filament drivers that control the flow of material from corresponding material supply units to the inlets, wherein the actuated rod assists to control axial flow of the filament through the heated chamber in coordination with the filament drivers by converting rotational energy into axial flow.

5. The hotend assembly according to claim 1, further comprising a number of channels within the heated chamber, wherein the channels are connected to the inlets.

6. The hotend assembly according to claim 1, further comprising a motor configured to rotate the actuated rod within the heated chamber.

7. The hotend assembly according to claim 6, further comprising a flexible coupling that couples the motor to the actuated rod.

8. The hotend assembly of claim 1, further comprising a number of heat sinks surrounding the inlets.

9. The hotend assembly of claim 1, wherein the actuated rod comprises at least one of:
    a number of flat faces;
    a helical shape; or
    a twin-screw configuration.

10. A hotend assembly for an additive manufacturing device, the hotend assembly comprising:
    a heated chamber;
    a number of inlets configured to feed filament into the heated chamber, wherein the inlets are inserted into the heated chamber within a common plane around the heated chamber with approximately 120 degrees of separation between each inlet;
    an exit orifice from a first end of the heated chamber;
    a bearing housing attached at a second end of the heated chamber opposite the first end;
    an actuated rod extending from the bearing housing into the heated chamber, wherein the filament enters the heated chamber tangentially to the actuated rod, and wherein the actuated rod imparts mechanical energy to the filament inside the heated chamber prior to extrusion through the exit orifice;
    a motor configured to rotate the actuated rod; and a flexible coupling that couples the actuated rod to the motor, wherein the bearing housing, the exit orifice, the actuated rod, the motor, and the flexible coupling are axially aligned.

11. The hotend assembly of claim 10, wherein the actuated rod comprises a number of flat faces.

12. The hotend assembly of claim 10, wherein the actuated rod comprises a helix.

13. A method of additive manufacturing, the method comprising:
feeding filament into a heated chamber of a hotend through a number of filament inlets, wherein the hotend is mounted to an additive manufacturing device;
heating the filament with the heated chamber;
rotating an actuated rod within the heated chamber to impart mechanical energy to the filament, wherein the actuated rod extends into the heated chamber from a bearing housing attached to a first end of the heated chamber, and wherein the filament enters the heated chamber tangentially to the actuated rod; and
extruding the filament through the exit orifice of the hotend at a second end of the heated chamber opposite the first end.

14. The method of claim 13, wherein the actuated rod distributes and disperses materials comprising the filament within the heated chamber.

15. The method of claim 13, wherein rotating the actuated rod uniformly blends two or more filaments.

16. The method of claim 13, further comprising a number of heat sinks surrounding the inlets.

17. The method of claim 13, wherein the actuated rod comprises at least one of:
a number of flat faces;
a helical shape; or
a twin-screw configuration.

18. The method of claim 13, wherein the actuated rod can rotate in a clockwise or counter-clockwise direction.

19. The hotend assembly of claim 4, wherein at least one material supplied by material supply units to the filament inlets is heterogeneous to materials supplied by the other material supply units.

20. The hotend assembly of claim 10, further comprising a number of filament drivers that control the flow of material from corresponding material supply units to the inlets, wherein at least one material supplied by material supply units to the filament inlets is heterogeneous to materials supplied by the other material supply units.

* * * * *